Patented July 3, 1951

2,559,411

UNITED STATES PATENT OFFICE 2,559,411

METHOD OF COLORING MARGARINE AND RESULTING PRODUCT

Ernest F. Drew, New York, N. Y., Harry G. Bissinger, Denville, N. J., and Jonas Kamlet, New York, N. Y., assignors to E. F. Drew & Co., Inc., New York, N. Y., a corporation of Delaware No Drawing. Application June 24, 1948, Serial No. 35,064

11 Claims. (Cl. 99—148)

The present invention is directed to the treatment of emulsions of fats and other constituents with water, such as butter, margarine, and other edible or inedible mixtures of this type.

It has been customary to provide coloring material for butter in order to introduce a sufficient amount of color therein during certain seasons of the year to supplement that naturally present in the butter. It has also been customary to provide coloring material for margarine and the like, which material was packaged separately from the margarine and was intended to be worked into the same by the ultimate consumer. Various devices for retaining the coloring material before use had been proposed. For instance, the coloring material was placed in bottles or capsules which were sold together with the package of margarine but such materials had disadvantages. The bottles or capsules were likely to be broken or even lost. Where a liquid was held in the capsules, it was difficult to work the same into the margarine uniformly and without loss of coloring material. Sometimes such coloring material or dyes were mixed with inert substances such as starch, flour or the like. Often dispersing agents were introduced into such mixtures which were in powdered form. These entailed considerable preparation and care was necessary in order to distribute the coloring material uniformly over the surface of the starch or flour. Difficulties arose in uniformly distributing such powdered material throughout the mass of margarine. This was especially the case since the volume of colored powder was quite small compared to the volume of margarine to be treated. As a result, a considerable amount of manipulation was necessary and usually the distribution of the coloring material throughout the margarine was not uniform.

The present invention is intended and adapted to overcome the difficulties and disadvantages inherent in prior compositions and materials of the type described, it being among the objects of the present invention to provide a method of coloring such emulsions which insures that the color is uniformly distributed throughout the mass of emulsion.

It is also among the objects of the present invention provide a coloring material which is in itself uncolored or in the leuco stage, whereby during the manufacture of said emulsion a uniform distribution of the correct amount of the material is effected.

It is still further among the objects of the present invention to provide a completed composition of a fat-water emulsion which is in itself colorless but which upon exposure to the air or oxygen assumes the desired color.

In practicing the present invention, there is provided a suitable coloring material or dye which is transformed into its leuco derivative and is substantially colorless. This is accomplished by reduction of the dye by suitable means, usually by hydrogenation. The leuco derivative is uniformly incorporated into the emulsion, such as margarine, in the absence of free oxygen and packaged without exposure to the air. The package is made air-tight so that during the time that the product is on the shelf and prior to the package being opened for use, no oxygen can gain access to the margarine or the like. Then when the package is opened for use, it is merely necessary for the user to moderately work the mass of margarine for a short time, whereby the oxygen or air will develop the color of the original dye.

Such a procedure has a number of advantages in that it avoids the use of powdered coloring materials, tablets, pellets or capsules of dyes and various other devices heretofore employed to obtain a coloring of such emulsions. The coloring material having been uniformly distributed in the margarine and the like in the factory, the final color obtained by the user is quite uniform. The working of the margarine to develop the color may be by any of the usual means as by beating, whipping or by hand.

In practicing the invention any one of a large number of dyes may be applied. Such dyes where they are to be used in margarine or the like must be so-called edible dyes which are permissible for foodstuffs. Also, such dyes or coloring materials may have value in themselves for food purposes.

The coloring material may be dissolved in a suitable solvent such as water or volatile organic liquid such as the lower alcohols including ethyl alcohol, acetone, benzene and any other suitable solvent, depending on the character of the dye. There is introduced into the solution a small quantity of a suitable hydrogenation catalyst, such as activated Raney nickel, copper, chromite, platinum, and any of the other well-known catalysts. The solution is then subjected to the action of hydrogen under well-known conditions for hydrogenation and hydrogenation is carried on until the dye is reduced to the leuco or colorless form. Thereafter the catalyst is filtered out of the solution and the solvent may be removed usually under reduced pressure. The thus reduced coloring materials are then mixed with the fat emulsion under such conditions that air cannot gain access thereto and the finished product is enclosed in air-tight containers. Various materials for said containers are available, such as plasticized cellophane, chlorinated rubber, polyvinyl chloride and the like.

The amount of coloring material or dye which may be used may be varied over wide limits, depending upon the intensity of the color of the dye itself and the amount of coloring which is desired for the margarine or the like. It has been found that generally from 5 to 100 mg. of the coloring material per pound of margarine is sufficient for practically all purposes. In some cases, such as where it is desired to add some coloring to butter which already contains coloring material naturally, less than 5 mg. per pound of butter may be used.

The following are specific examples of the operation of the present invention.

Example 1

There is provided riboflavin, which is 6,7-dimethyl, 9-(d-1'-ribityl) isoalloxazine. This coloring material, which is known as vitamin $B_2$ is a physiological component of many foods and can be safely used in amounts far in excess of what can be supplied when used as coloring material for margarine or butter. The riboflavin is dissolved in ethyl alcohol, a suitable catalyst such as Raney nickel is added, and hydrogen is introduced under sufficient temperature and pressure to hydrogenate the material. Care must be taken to hydrogenate only to the substantially colorless leuco-riboflavin. It is desirable to reach this stage and not to arrest the hydrogenation earlier because otherwise the substance shows various colors. It is undesirable to conduct the hydrogenation further as undesirable octahydro leuco-riboflavin may be formed.

The leuco-riboflavin is filtered free from catalyst and the alcohol is evaporated therefrom in the absence of air. The resulting colorless powder is then incorporated in a closed and air-free mixing device into the margarine, which is then packaged in air-tight containers.

Example 2

120 mg. of riboflavin is dissolved in a liter of milk and 5 grams of activated Raney nickel catalyst are added. Hydrogen is introduced under normal pressure at about 50° C. and the mixture is kept agitated until the theoretical amount of hydrogen, namely 7.2 cc. thereof has been absorbed. The hydrogenated material is filtered to remove the catalyst and the solution in the milk is mixed with a sufficient amount of material to make 10 lbs. of margarine. The product is then packed in air-tight containers without exposure to air.

Other dyes or coloring materials which are capable of use in accordance with the present invention are as follows:

Erythrosine—the sodium salt of tetraiodofluorescein,
Naphthol Yellow S—the sodium salt of 2,4-dinitro-alpha-naphthol-7-sulfonic acid,
Guinea Green B—condensate of benzylethylaniline sulfonic acid with benzaldehyde,
Light Green SF Yellowish—condensation product of benzylethylaniline sulfonic acid with benzaldehyde sulfonic acid,
Indigo Carmine—the di-sodium salt of indigotin disulfonic acid,
Brilliant Blue FCF—condensation product of ethylbenzyaniline sulfonic acid with benzaldehyde-o-sulfonic acid.
Tartrazine—trisodium salt of 3-carboxy, 5-hydroxy, 1-p-sulfophenyl, 4-p-sulfophenyl-azopyrazole.

Each of the aforesaid dyes may be treated in the same manner as set forth generally in Examples 1 and 2, in order to give a finished product. The dyes themselves may be dissolved in either aqueous solvents or in volatile organic solvents, as the case may be.

Although the invention has been described setting forth several specific embodiments thereof, the invention is not limited to the details thereof. Various changes in the procedure may be made within the spirit of the invention, it being essential that the coloring matters used in practicing the invention be first reduced to the leuco form prior to incorporation in the margarine, and that oxygen-free conditions be maintained throughout the procedure. While the reduction of the coloring matter has been described as being obtained by hydrogen and a catalyst, other known methods of reducing coloring materials to the leuco form may be used, such as chemical reduction. Mixtures of dyes may be used and other dyes suitable for the specific purposes may be used in place of those named herein. The solution of the leuco derivative need not in all cases be evaporated to remove the solvent but in some instances it may be desirable or feasible to incorporate such solution directly into the fat-water emulsion to be colored. In such case, the solvent may be allowed to remain in the finished composition or may be removed therefrom.

These and other changes in the details of the invention may be made within the scope thereof and the invention is, therefore, to be broadly construed and not to be limited except by the character of the claims appended hereto.

We claim:

1. A method of treating fat-water emulsions of the character of margarine which comprises subjecting an edible dye to reduction to form its leuco derivative, mixing a small proportion of said substantially colorless leuco derivative of a normally colored compound with such an emulsion in the absence of free oxygen, said colored compound being reducible to the leuco state and oxidizable by oxygen in the air to the colored state, and thereafter exposing said emulsion to oxygen at room temperatures to develop the color of said derivative throughout said emulsion.

2. A method of treating fat-water emulsions of the character of margarine which comprises subjecting an edible dye to reduction to form its leuco derivative, mixing a small proportion of said substantially colorless leuco derivative of a normally colored compound with such an emulsion in the absence of free oxygen, said colored compound being reducible to the leuco state and oxidizable by oxygen in the air to the colored state, and thereafter exposing said emulsion to oxygen at room temperatures to develop the color of said derivative throughout said emulsion, the amount of said dye being from 5 to 100 mg. per pound of said emulsion.

3. A method of treating fat-water emulsions of the character of margarine which comprises subjecting an edible dye to the reducing action of hydrogen and a catalyst to form its leuco derivative, mixing a small proportion of said substantially colorless leuco derivative of a normally colored compound with such an emulsion in the absence of free oxygen, said colored compound being reducible to the leuco state and oxidizable by oxygen in the air to the colored state, and thereafter exposing said emulsion to oxygen at room temperatures to develop the color of said derivative throughout said emulsion.

4. A method of treating fat-water emulsions of the character of margarine which comprises dissolving an edible dye in a suitable solvent, passing hydrogen therethrough in the presence of a catalyst to reduce said dye to the leuco derivative, mixing a small proportion of said substantially colorless leuco derivative of a normally colored compound with such an emulsion in the absence of free oxygen, said colored compound being reducible to the leuco state and oxidizable by oxygen in the air to the colored state, and thereafter exposing said emulsion to oxygen at room temperatures to develop the color of said derivative throughout said emulsion.

5. A method of treating fat-water emulsions of the character of margarine which comprises dissolving riboflavin in an ingestible aqueous medium, passing hydrogen therethrough in the presence of a catalyst to reduce said riboflavin to leuco-riboflavin, mixing a small proportion of said substantially colorless leuco derivative of a normally colored compound with such an emulsion in the absence of free oxygen, and thereafter exposing said emulsion to oxygen at room temperatures to develop the color of said derivative throughout said emulsion.

6. A method of treating fat-water emulsions of the character of margarine which comprises dissolving riboflavin in milk, passing hydrogen therethrough in the presence of a catalyst to reduce said riboflavin to leuco-riboflavin, mixing a small proportion of said substantially colorless leuco derivative of a normally colored compound with such an emulsion in the absence of free oxygen, and thereafter exposing said emulsion to oxygen at room temperatures to develop the color of said derivative throughout said emulsion.

7. A method of treating fat-water emulsions of the character of margarine which comprises subjecting an edible dye to reduction to form its leuco derivative, mixing a small proportion of said substantially colorless leuco derivative of a normally colored compound with such an emulsion in the absence of free oxygen, and thereafter exposing said emulsion to oxygen at room temperatures to develop the color of said derivative throughout said emulsion, said dye being a compound of benzylethylaniline sulphonic acid with a substance taken from the class consisting of benzaldehyde and benzaldehyde sulphonic acid.

8. A fat-water emulsion of the character of margarine having distributed therein a small proportion of the substantially colorless leuco derivative of an edible dye said colored compound being reducible to the leuco state and oxidizable by oxygen in the air to the colored state.

9. A fat-water emulsion of the character of margarine having distributed therein a small proportion of the substantially colorless leuco derivative of riboflavin.

10. A fat-water emulsion of the character of margarine having distributed therein a small proportion of the substantially colorless leuco derivative of a normally colored edible compound in the amount of 5 to 100 mg. per pound of said emulsion said colored compound being reducible to the leuco state and oxidizable by oxygen in the air to the colored state.

11. A fat-water emulsion of the character of margarine having distributed therein a small proportion of the substantially colorless leuco derivative of a normally colored edible compound, enclosed in an air-tight container said colored compound being reducible to the leuco state and oxidizable by oxygen in the air to the colored state.

ERNEST F. DREW.
HARRY G. BISSINGER.
JONAS KAMLET.

REFERENCES CITED

The following references are of record in the file of this patent:

UNITED STATES PATENTS

| Number | Name | Date |
|---|---|---|
| 1,863,332 | Hailwood et al. | June 14, 1932 |
| 1,919,025 | Jones et al. | July 18, 1933 |
| 2,052,175 | Haurand | Aug. 25, 1936 |
| 2,347,640 | Peters | May 2, 1944 |

OTHER REFERENCES

U. S. Dept. of Agriculture Bulletin No. 448, Feb. 15, 1917, article entitled "Separation and Identification of Food Coloring Substances," pages 18, 19, and 20.

"Vat Dyestuffs and Vat Dyeing," 1948, by M. R. Fox, published by John Wiley and Sons, Inc., 440 Fourth Avenue, New York, page 100.